United States Patent [19]

Lefebvre et al.

[11] Patent Number: 5,205,162
[45] Date of Patent: Apr. 27, 1993

[54] UNDERWATER VEHICLE LAUNCH PERFORMANCE TEST FACILITY

[75] Inventors: Paul J. Lefebvre, Tiverton; John A. Schwemin, Middletown, both of R.I.

[73] Assignee: The United States of America as represented by the Secretary of the Navy, Washington, D.C.

[21] Appl. No.: 956,326

[22] Filed: Oct. 5, 1992

[51] Int. Cl.$^5$ .......................... B63B 9/02; G01M 10/00
[52] U.S. Cl. ..................................................... 73/148
[58] Field of Search ................................... 73/148, 147

[56] References Cited

U.S. PATENT DOCUMENTS

| | | | |
|---|---|---|---|
| 3,314,285 | 4/1967 | Beigner et al. | 73/167 |
| 3,513,696 | 5/1970 | Blair | 73/148 |
| 4,116,056 | 9/1978 | Bulychev et al. | 73/147 |

FOREIGN PATENT DOCUMENTS 1638583 3/1991 U.S.S.R. ................................ 73/148

Primary Examiner—Daniel M. Yasich
Attorney, Agent, or Firm—Michael J. McGowan; Prithvi C. Lall; Michael F. Oglo

[57] ABSTRACT

A facility for permitting launch performance tests to be conducted on an underwater vehicle, such as a torpedo, includes a housing having an opening therethrough defining a tubular chamber for receiving a vehicle therein. A piston is also positioned within the tubular chamber. A link disposed between the piston and the vehicle has a pair of opposing end portions connected with the piston and the vehicle, respectively. A channel is positioned adjacent to the housing and has water flowing therein at a predetermined velocity. The water within the channel communicates with the tubular chamber to allow water flowing within the channel to enter the tubular chamber and surround the vehicle with the vehicle at its rest position. A drive device is operable to move the piston through the tubular chamber a preselected distance sufficient to move the vehicle and the water surrounding the vehicle out of the tubular chamber and into the channel. The link is connected with the piston and the vehicle to permit the vehicle to move both laterally and in rotational fashion within the tubular chamber with the vehicle at its rest position and as the vehicle moves through the tubular chamber in response to hydrodynamic forces acting on the vehicle generated by the flowing channel water and also to stop the advancement of the vehicle after the piston has moved its preselected distance.

16 Claims, 3 Drawing Sheets

UNDERWATER VEHICLE LAUNCH PERFORMANCE TEST FACILITY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention:

The present invention relates generally to an underwater vehicle launch test facility and, more particularly, to such a facility which permits the vehicle to move laterally and rotate in reaction to hydrodynamic forces acting on it during testing so that realistic vehicle launch dynamics and interactions between the vehicle and the launch facility may be obtained.

(2) Description of the Prior Art:

A number of vehicles are launched from underway submarine vessels ranging from torpedoes and missiles that are several feet in diameter and over twenty (20) feet long to small devices that long. These vehicles are launched from inside tubes having a slightly larger inside diameter than the diameter of the vehicle to be launched. The vehicles are launched into the flow stream created by the vessel's forward motion through the water. Launch is effected by various including means pumping water into the back of the tube which imparts longitudinal motion to the vehicle and carries it outside of the submarine vessel's hull.

The flow stream imports various hydrodynamic forces to the vehicle which tends to divert its longitudinal motion and causes the vehicle to bear against the walls of the launch tube and later deflects its trajectory from its original path once it has left the tube. This may result in vehicle damage, unacceptable vehicle dynamics, or restrictions on the vessel speed and maneuvers prior to and during the launch of the vehicle.

In order to predict how vehicles of various size will react during actual launch from a submarine vessel, it has been suggested to evaluate a vehicle's launch characteristics prior to it's actual use. For example, U.S. Pat. No. 3,314,285 discloses a test facility for evaluating the launch and limited free flight characteristics of a vehicle into a still fluid. This test facility includes releasable brackets that grab and hold the vehicle in an essentially horizontal position prior to launch. At launch initiation, the brackets release their grip on the vehicle and a piston imparts downward motion to the vehicle. Once the vehicle has traveled a certain distance, the vehicle's motion is restrained by cables that attach to the vehicle and the capturing the vehicle in a cubical box whose walls are made of flexible cord in order to minimize damage to the vehicle.

The above-referenced patent discloses basically a drop launch test facility which only provides information on the vehicle itself without taking into account the substantial interactions between the vehicle and the vehicle's launch tube. As a result, the use of this type of facility is no longer favored. It had been found that more realistic results may be obtained by conducting performance tests of a vehicle as the vehicle is being launched from a submarine launcher test facility which simulates actual launch of the vehicle from the launch tube in order to determine the launch dynamics of the vehicle and the interactions between the launch facility and the vehicle throughout the launch.

Two types of tests are presently used to evaluate vehicle and launcher performance. Both tests utilize a circulating water channel which provides a flow stream operable to generate hydrodynamic forces which will interact with the vehicle during launch. In the first test, after the vehicle is launched it is completely free of the launcher and is allowed to react to the flow stream. This test is referred to as a "free launch test". In the second test, the vehicle is constrained at launch by a rod rigidly affixed to the vehicle's tail. The rod limits vehicle motion to a strictly longitudinal path and the vehicle is prevented from undergoing normal rotational and lateral motions in reaction to the hydrodynamic forces created by the flow stream. This test is referred to as a "captive launch test".

The major disadvantage of the free launch test is that after each launch the vehicle must be manually retrieved from within the water channel and reloaded into the launch tube for the next test. This can take considerable time due to limited accessibility and restrict the number of tests conducted. During free launch testing, the vehicle must also be caught by a net or other mechanism located within the water channel to prevent the vehicle from being damaged by striking the walls of the channel. In addition, tests on certain vehicles may not be permitted in a given water channel due to the risk of damaging the channel if the vehicle is not caught and is carried by the flow stream into the water channel pumps or flow stream conditioning devices.

The major disadvantage of the captive launch test is that it unrealistically restricts the vehicle's motion. Although the captive launch test does provide a benefit in that this test eliminates the need for a net or other mechanism positioned in the water channel, the rigid connection between the rod and the vehicle results in errors in the hydrodynamic forces experienced by the captive vehicle.

Consequently, a need exists for an underwater vehicle test facility which retains some of the benefits of the captive launch test facility and also permits the vehicle to move laterally and rotate in reaction to hydrodynamic forces acting on it during launch to allow realistic vehicle launch dynamics and interactions between the vehicle and the launcher to be obtained.

SUMMARY OF THE INVENTION

The present invention relates to an underwater vehicle launch performance test facility designed to satisfy the aforementioned needs. The underwater vehicle launch performance test facility of the present invention has a construction which allows the vehicle to move laterally and rotate in reaction to hydrodynamic forces generated by the water channel flow stream so that realistic vehicle dynamics and interactions between the vehicle and the launcher may be obtained. In this novel test facility, the vehicle is coupled to the launcher to eliminate the need for manual vehicle retrieval. Since manual vehicle retrieval is not required, considerable time can be saved between vehicle tests. In addition, vehicle tests can be conducted in facilities not permitting free launch tests since the potential for damage due to collisions between the water channel and the vehicle are eliminated.

Accordingly, the present invention is directed to a facility for permitting launch performance tests to be conducted on an underwater vehicle such as a scale model torpedo or a counter-measure device. The facility comprises: (a) a housing having a opening therethrough defining a tubular chamber for receiving a vehicle therein; (b) a piston positioned within the tubular chamber; (c) linkage means disposed between the piston and the vehicle and having a pair of opposing end portions connected with the piston and the vehicle, respectively; (d) a channel adjacent to the housing having water therein which flows at a predetermined velocity and communicating with the tubular chamber to allow water flowing within the channel to enter the tubular chamber and surround the vehicle with the vehicle at a rest position; (e) a drive device operable to move the piston through the tubular chamber a preselected distance sufficient to move the vehicle and the water surrounding the vehicle out of the tubular chamber and into the channel; and (f) the linkage means is connected with the piston and the vehicle to permit the vehicle to move both laterally and in rotational fashion within the tubular chamber with the vehicle at its rest position and as the vehicle moves through the tubular chamber in response to hydrodynamic forces acting on the vehicle generated by the flowing water and also stop the advancement of the vehicle after the piston has moved its preselected distance.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DESCRIPTION OF THE PREFERRED EMBODIMENT

Figure 1:
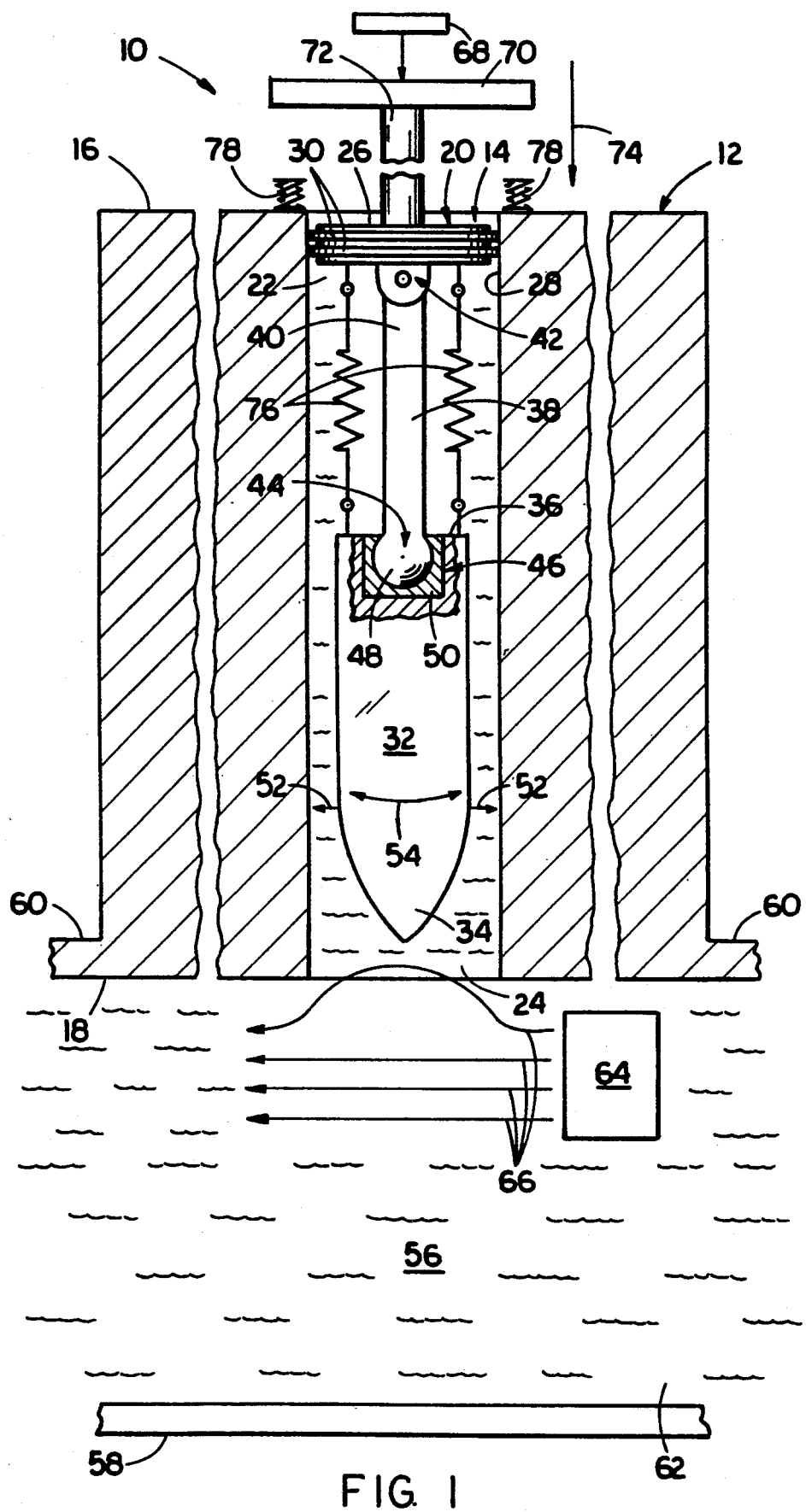
FIG. 1 is a top plan view, partly in section, of the underwater vehicle launch performance test facility of the present invention, illustrating a vehicle positioned within a tubular chamber and connected with a piston also positioned within the chamber via a link which allows the vehicle to rotate and move laterally within the chamber in-response to hydrodynamic forces generated by water flowing within a flow channel positioned adjacent to the tubular chamber.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown a top plan view, partly in cross section, of the underwater vehicle launch performance test facility of the present invention which is designated generally by the numeral 10. The test facility 10 includes a housing 12 shown in section to illustrate a tubular chamber 14 formed in the housing 12. The tubular chamber 14, which has a generally circular cross-sectional configuration, extends between the housing rear wall 16 and the housing front wall 18. In addition, the tubular chamber 14 is open at the rear and front walls 16 and 18, respectively, to form a passage completely through the housing 12.

A piston 20 is positioned within the tubular chamber 14. The piston 20 has a generally circular cross-sectional configuration and a diameter slightly less than the diameter of the tubular chamber 14 to allow the piston 20 to move back and forth through the tubular chamber 14 between the rear end portion 22 and the front end portion 24 of the tubular chamber 14. The piston 20 has an outer circumferential wall 26 adjacent to the cylindrical wall 28 of the tubular chamber 14. One or more seal rings 30 extending from and circumscribing the circumferential wall 26 contact the cylindrical wall 28 to provide a water-tight seal between the piston 20 and the tubular chamber 14.

A vehicle 32 is positioned within the tubular chamber 14. The vehicle may be of any diameter and length desired so long as the vehicle 32 fits completely within the tubular chamber 14. Although the vehicle shown in FIG. 1 has a tapered forward end portion 34 and a blunt rear end portion or tail 36, it should be understood that this is done for illustrative purposes only and thus the vehicle 32 is but an example of the type of vehicle that may be tested within the test facility 10.

A link 38 is positioned within the tubular chamber 14 and extends between the piston 20 and the vehicle 32. The link 38, which may be made from a rigid rod or a rod made from a flexible composite material, has a first end portion 40 pivotally connected with the piston 20 via a yoke and pin arrangement 42. The link 38 also has a second end portion 44 connected with the rear end portion 36 of the vehicle 32 via a ball and socket arrangement 46. As seen in FIG. 1, the second end portion 44 of the link 38 forms an enlarged sphere 48 which fits within and is retained by a socket 50 secured to the rear end portion 36 of the vehicle 32. The yoke and pin arrangement 42 and the ball and socket arrangement 46 are both conventional. However, as will be described later herein, the use of these types of piston/link/vehicle connection arrangements allows the vehicle 32 to move both laterally (as indicated by the arrows 52) and in rotational fashion (as indicated by the arrow 54) within the tubular chamber 14 during vehicle launch performance tests. In addition, although the first end portion 40 of the link 38 is illustrated as being connected with the piston 20 via the yoke and pin arrangement 42, a ball and socket arrangement such as the ball and socket arrangement 46 may be utilized if desired. In addition, if a flexible composite rod is used, this joint may be eliminated owing to the lateral motion afforded by the flexible link or rod.

A channel, generally designated by the numeral 56, is positioned adjacent to the front wall 18 of the housing 12. The channel 56 illustrated in FIG. 1, which forms a portion of a conventional circulating water channel, includes a wall 58 spaced from the front wall 18 of the housing 12 and a wall 60 which extends from the housing 12 as shown. The walls 58, 60 are spaced from each other to define a water-filled raceway 62. The water within the raceway 62 flows at a predetermined velocity and since the front end portion 24 of the tubular chamber 14 communicates with the channel 56, water flowing within the raceway 62 enters the tubular chamber 14 at it's front end portion 24 to surround the vehicle 32 and the link 38. Water within the tubular chamber 14 is prevented from exiting the rear end portion 22 of the tubular chamber 14 by the seal rings 30 extending from the piston 20.

Figure 3:
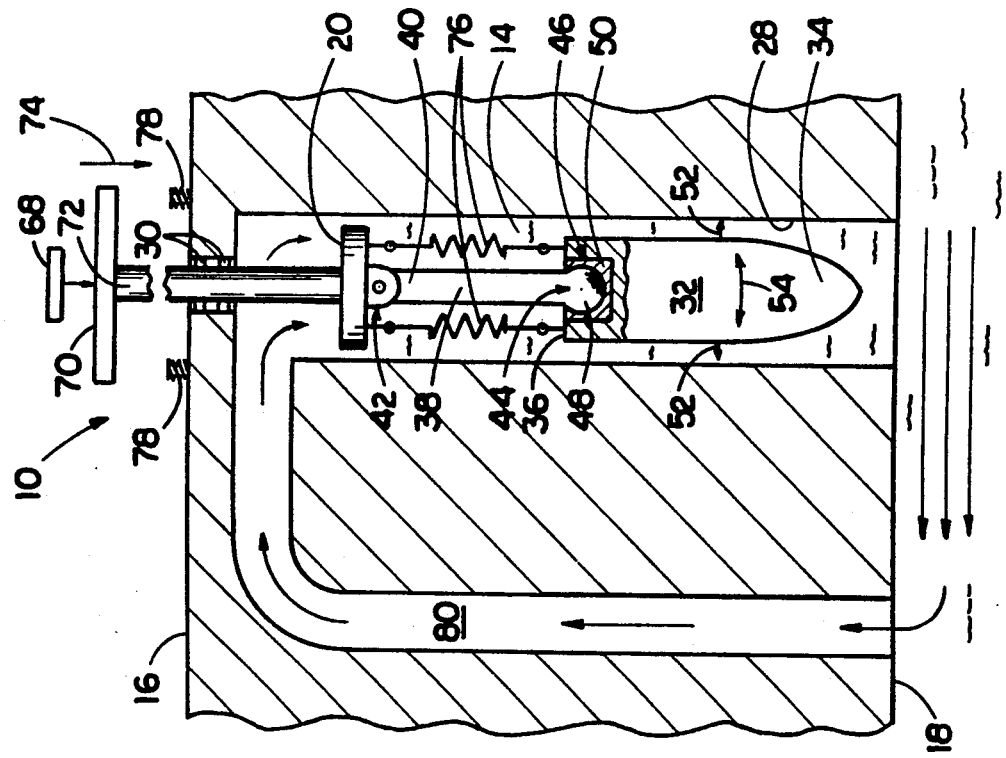
FIG. 3 is a view similar to the view of FIG. 1, illustrating an alternative embodiment of the invention showing an additional feedback channel in the housing with the shaft of the drive the rear wall of the housing.

The velocity of the water flowing through the raceway 62 is controlled to a preselected velocity by a pump schematically illustrated at 64. The pump 64 is a variable speed pump which pushes water (indicated by the flow arrows 66) across the front end portion 24 of the tubular chamber 14. Another option is shown in FIG. 3, where seal rings 30 are fixed to the housing rear wall 16 and sealed against the shaft 72 to prevent water from exiting. In this version a conduit 80 provides fuel water behind the piston 20 during the launch. As seen in FIG. 1, some of the water pushed across the front end portion 24 of the tubular chamber 14 enters the tubular chamber 14 and causes hydrodynamic forces to act on the vehicle 32. Since the vehicle 32/link 38 connection allows for all vehicle rotational degrees of freedom and the link 38/piston 20 connection allows the vehicle 32 and the link 38 to pivot in response to hydrodynamic forces acting on the vehicle 32, realistic vehicle launch dynamics and interactions between the vehicle 32 and the tubular vehicle tubular chamber interactions may be obtained when the vehicle 32 is at its rest position as illustrated in FIG. 1, as well as when the vehicle 32 is being moved though the tubular chamber 14 via movement of the piston 20 and after the vehicle 32 has been expelled from the tubular chamber 14. The hydrodynamic forces acting on the vehicle 32 may be varied by varying the velocity of the water flowing through the raceway 62 in order to determine vehicle 32 launch dynamics and vehicle tubular chamber interactions over a wide range. The hydrodynamic forces are varied simply by varying the speed of flow control means, such as a pump 64. The specific test mechanical and electrical/electronic devices used to determine the vehicle launch dynamics and vehicle tubular chamber interactions are not the subject of this invention and will not be described herein.

Movement of the vehicle 32 through the tubular chamber 14 is accomplished via a drive device schematically illustrated by the numeral 68. The drive device 68 is operatively connected with an end cap 70, and the end cap 70 is, in turn, connected with the piston 20 via a shaft 72. Operation of the drive device 68 causes the end cap 70 to move in a vertical direction as indicated by the arrow 74. As the end cap 70 moves, the shaft 72 pushes the piston 20/link 38/vehicle 32 arrangement through the tubular chamber 14. Forward advancement of the vehicle can be stopped smoothly without large impact shock between end cap 70 and rear wall 16 by utilizing springs or shock absorbing devices 78 or by its own decelerating means. As is apparent from the above, the shaft 72 must have a minimum length sufficient to allow the vehicle 32 to completely exit the tubular chamber 14 before the end cap 70 contacts the rear wall 16 of the housing 12. As the vehicle 32 is moving through the tubular chamber 14, the vehicle 32 freely rotates and moves laterally in response to hydrodynamic forces generated by the water flowing through the raceway 62 and into the tubular chamber 14.

Figure 2:
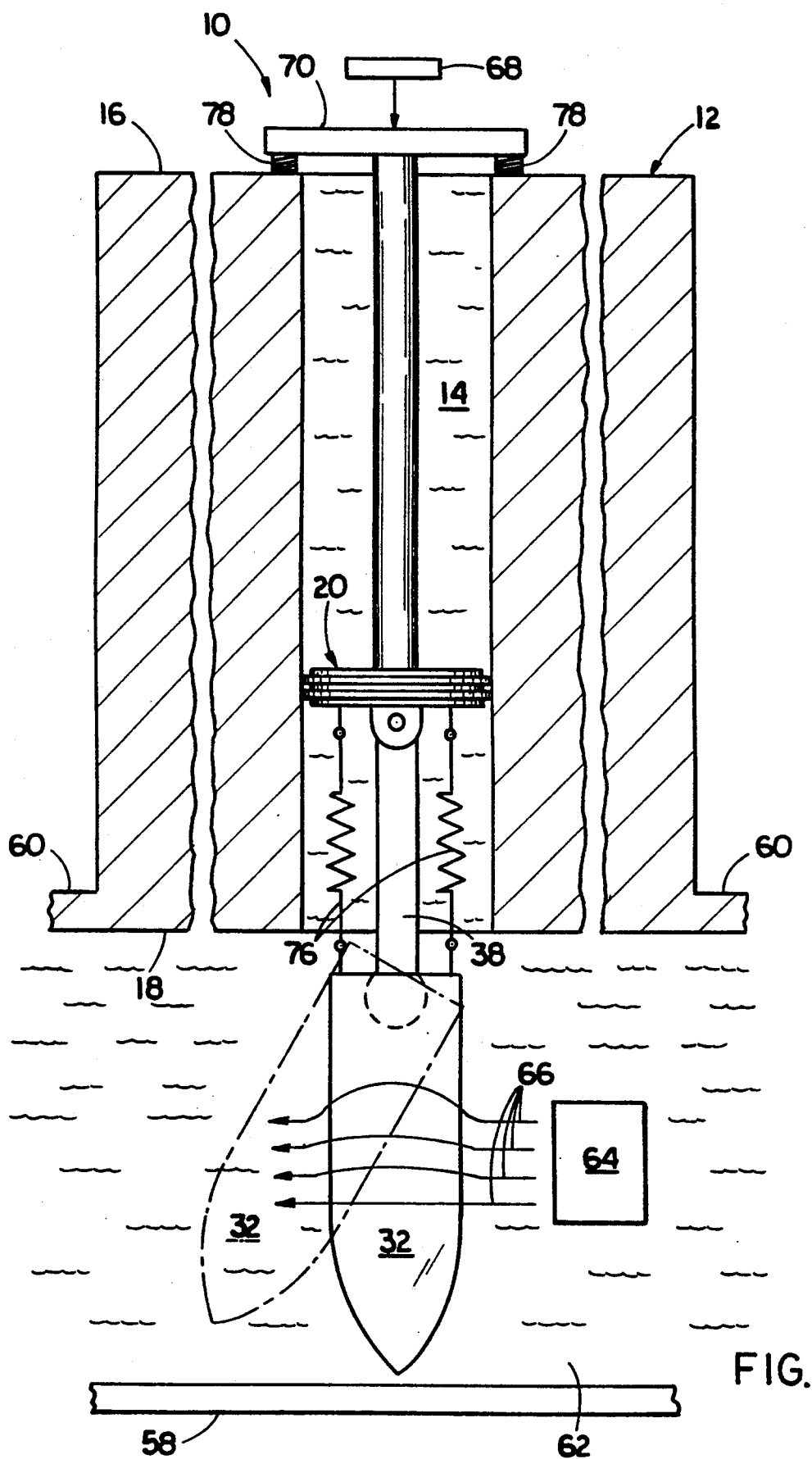
FIG. 2 is a view similar to the view of FIG. 1, illustrating the vehicle positioned within the flow channel after the piston has been moved through the tubular chamber.

Now referring to FIG. 2, there is illustrated a top plan view, partly in section, of the underwater vehicle launch performance test facility 10 previously described in FIG. 1. As seen in FIG. 2, the piston 20 has been moved through the tubular chamber 14 by operation of the drive device 68. Movement of the piston 20 through the chamber 14 in a direction towards the front wall 18 of the housing 12 is stopped since the end cap 70 is in contact with the rear wall 16 of the housing 12. With the piston 20 in the position shown, the vehicle 32 is completely expelled from the tubular chamber 14 and is located within the raceway 62. The force of the water flowing through the raceway 62 (as indicated by the flow arrows 66) causes the vehicle 32 to move from the position illustrated in solid to the position illustrated in phantom. This movement is possible because of the ball and socket connection between the link 38 and the vehicle 32 (ball and socket connection illustrated in FIG. 1).

With the vehicle 32 positioned as illustrated in phantom in FIG. 2, a launch performance test of the vehicle 32 has been completed. Since the vehicle 32 is captured by the link 38, the vehicle 32 cannot escape the test facility 10. In order to perform another test, the flow of water through the raceway 62 is stopped by shutting down the pump 64. Thereafter, the vehicle 32 is drawn into the tubular chamber 14 by moving the piston 20 from its FIG. 2 location within the tubular chamber 14 to its FIG. 1 location.

In order to prevent the vehicle 32 from being damaged as it is being drawn into the tubular chamber 14, a pair of resilient members 76 extending between the piston 20 and the vehicle 32 are utilized. The pair of resilient members 76, which may either be springs, elastomeric straps or other suitable resilient members, are stretched as the water flow within the raceway 62 deflects the vehicle 32 to the position illustrated in phantom and out of alignment with the tubular chamber 14. Once the water flow is stopped, the resilient members 76 return to their normal configuration and bring the vehicle into alignment with the tubular chamber 14.

To assist drawing the vehicle into the tube, the rear end of the vehicle may be tapered thus providing a guide, or an additional conical guide member may be added to the shaft to guide the vehicle during re-entry into the tube. If a flexible composite shaft is used, the inherent resilience of the shaft will center the vehicle once the water flow is stopped.

Another embodiment similar to the one shown in FIG. 1 is seen in FIG. 3, with the difference being that the seal rings 30 are now fixed to the housing rear wall 16 and seals against the shaft 72 to prevent water from exiting. In this version a conduit 80 provides feed water behind the piston during the launch.

Figure 5:
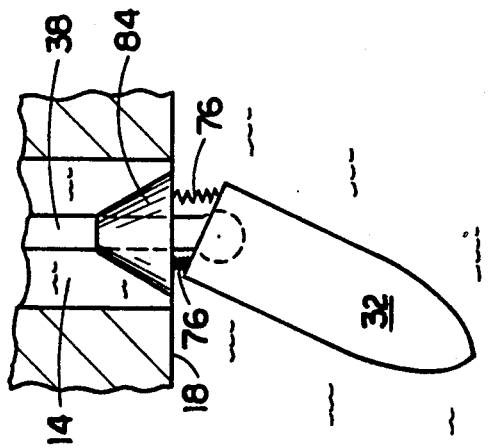
FIG. 5 shows another alternative embodiment for facilitating entry of the vehicle into the tubular chamber, a conical member being mounted on the shaft near the location of the shaft's connection to the rear of the vehicle.
Figure 4:
FIG. 4 shows an alternative embodiment of the vehicle having a tapered rear end portion for facilitating entry into the tubular chamber of the housing.

Additional alternatives have been shown in FIGS. 4 and 5. To assist drawing the vehicle 32 into the tubular chamber 14, the rear end of the vehicle may be tapered as shown by the numeral 82 in FIG. 4 in thus providing a guide for re-entry of the vehicle into the tubular chamber, or alternatively, a conical guide member 84, as shown in FIG. 5, may be added to the shaft 38 to guide the vehicle 32 during re-entry into the tubular chamber 14. In the FIG. 5 alternative embodiment, the resilient members 76 could be attached to the conical guide member 84. If a flexible composite shaft is used, the inherent resilience of the shaft will center the vehicle once the water flow is stopped.

It is thought that the present invention and many of its attendant advantages will be understood from the foregoing description and it will be apparent that various chances may be made in the form, construction and arrangement of the parts of the invention described herein without departing from the spirit and scope of the invention or sacrificing all of its material advantages, the form hereinbefore described being merely a preferred or exemplary embodiment thereof.

What is claimed is:

1. A facility for permitting launch performance tests to be conducted on an underwater vehicle such as a torpedo, comprising:
   a housing having an opening therethrough defining a tubular chamber for receiving said underwater vehicle therein, said housing mounted on a wall of a raceway forming a channel therein;
   a piston positioned within said tubular chamber;
   linkage means disposed between said piston and said vehicle and having a pair of opposing end portions connected with said piston and said vehicle, respectively;
   said channel adjacent to said housing having water therein which flows at a predetermined velocity and is communicating with said tubular chamber to allow water flowing within said channel to enter said tubular chamber and surround said vehicle with said vehicle at a rest position;
   drive means operable to move said piston through said tubular chamber a preselected distance sufficient to move said vehicle and said water surrounding said vehicle out of said tubular chamber and into said channel; and
   said linkage means being connected with said piston and said vehicle to permit said vehicle to move both laterally and in rotational fashion within said tubular chamber with said vehicle at its rest position and as said vehicle moves through said tubular chamber in response to hydrodynamic forces acting on said vehicle generated by said flowing water and also stop the advancement f said vehicle after said piston has moved said preselected distance.

2. The facility as recited in claim 1, wherein:
   said housing includes a rear wall and a front wall and said tubular chamber extends through said housing between said front and rear walls;
   said channel is positioned adjacent to said housing front wall; and
   said drive means is positioned adjacent to said housing rear wall and is connected with said piston.

3. The facility as recited in claim 2, wherein:
   said piston includes a circumferential wall; and
   at least one seal ring is positioned around said circumferential wall in contact with said tubular chamber to prevent water entering said tubular chamber from said channel to leak past said piston and exit said tubular chamber at said housing rear wall.

4. The facility as recited in claim 2, which includes an end cap movable with said piston and operable to contact said housing rear wall after said piston moves said preselected distance and stop the movement of said piston.

5. The facility as recited in claim 4, wherein said end cap is connected with said piston by a shaft member.

6. The facility as recited in claim 2, which includes flow control means for varying the velocity at which said water flows through said channel to vary the drag forces acting on said vehicle positioned within said tubular chamber.

7. The facility as recited in claim 6, wherein said flow control means is a variable speed pump.

8. The facility as recited in claim 2, wherein said drive means is a pneumatic or hydrodynamic cylinder.

9. The facility as recited in claim 2, wherein said drive means is a linear motor.

10. The facility as recited in claim 1, which includes resilient means extending between said piston and said vehicle operable to align said vehicle with said tubular chamber after said vehicle has moved out of said tubular chamber and the flow of water within said channel has been stopped.

11. The facility as recited in claim 10, wherein said resilient means include a pair of spring members.

12. The facility as recited in claim 10, wherein said resilient means include a pair of elastomeric straps.

13. The facility as recited in claim 1, wherein one end portion of said linkage means is connected with said piston via a yoke and pin arrangement and the opposite end portion of said linkage means is connected with said vehicle via a ball and socket arrangement.

14. The facility as recited in claim 1, wherein both ends of said linkage means are connected with said piston and said vehicle, respectively, via a ball and socket arrangement.

15. The facility as recited in claim 1, wherein said linkage mean is made from a rigid rod.

16. The facility as recited in claim 1, wherein said linkage means is a rod made from a flexible composite material.

* * * * *